UNITED STATES PATENT OFFICE.

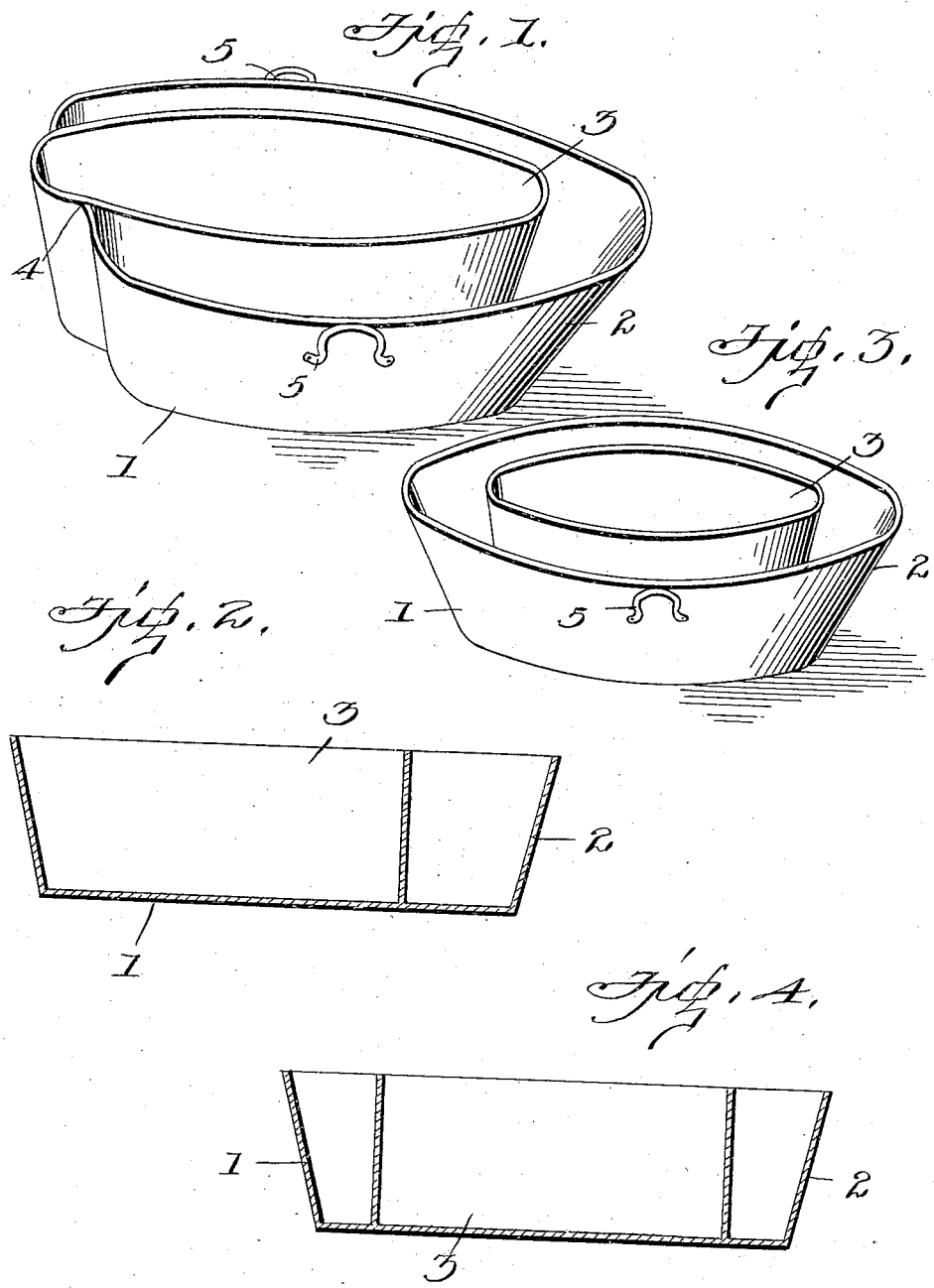

FRED BLISS, OF HAMMOND, INDIANA, ASSIGNOR OF ONE-HALF TO GOTTLE BLISS, OF HAMMOND, INDIANA.

DOUBLE PAN.

No. 874,562.　　　Specification of Letters Patent.　　　Patented Dec. 24, 1907.

Application filed May 20, 1907. Serial No. 374,642.

*To all whom it may concern:*

Be it known that I, FRED BLISS, a citizen of the United States, residing at Hammond, in the county of Lake and State of Indiana, have invented certain new and useful Improvements in Double Pans; and I do declare the following to be a full, clear, and exact description of the invention, such as will enable others skilled in the art to which it appertains to make and use the same.

This invention relates to improvements in pans.

The object of the invention is to provide a pan having a plurality of compartments, thereby greatly facilitating the use of the same.

With this object in view, the invention consists of certain novel features of construction, combination and arrangement of parts as will be more fully described and particularly pointed out in the appended claims.

In the accompanying drawings, Figure 1 is a perspective view of a pan constructed in accordance with the invention; Fig. 2 is a vertical sectional view of the same; Fig. 3 is a perspective view of a modified form of pan; and Fig. 4 is a vertical sectional view of the same.

Referring particularly to Figs. 1 and 2 of the drawing, 1 denotes the outer pan, which is here shown as substantially circular in form, having tapering sides, 2. Arranged in the outer pan 1 is an inner pan, 3, which is also circular in form, and preferably has vertical sides. The inner pan 3 is somewhat smaller than the outer pan 1, and is arranged in said outer pan to one side of the center thereof, so that one side of the pan 3 intersects and projects through the side of the outer pan as shown at 4. This arrangement of the inner pan enables the center of the same to be more readily reached. If desired, the outer pan 1 may be provided with suitable handles, 5.

In the construction shown in Figs. 3 and 4 of the drawing, the inner pan 3 is arranged in the center of the outer pan 1, thus providing for a continuous annular space between the sides of the inner and outer pan. With the exception of the central arrangement of the inner pan, 3, the form of device shown in Figs. 3 and 4, is the same as that described in connection with the first two figures of the drawing.

By providing a pan constructed as herein shown and described, the operation of dishwashing is greatly facilitated, and when using the pan for this purpose the soiled dishes are washed in the inner pan and are placed in the compartment between the two pans where they are allowed to drain, thereby dispensing with the necessity of providing a separate drain pan. The arrangement of the pans as herein shown and described will also be found useful for any other purpose, such, for instance, as cleaning or peeling of vegetables, wherein the unpeeled vegetables and the parings are placed in the outer compartment, while the pared vegetables may be placed in the inner pan.

From the foregoing description, taken in connection with the accompanying drawing, the construction and operation of the invention may be readily understood without requiring a more extended explanation.

Various changes in the form, proportion and the minor details of construction may be resorted to without departing from the principle or sacrificing any of the advantages of the invention as defined in the appended claims.

Having thus fully described my invention, what I claim as new and desire to secure by Letters-Patent, is:

An outer pan and an inner pan arranged within said outer pan to project through one side of the same, substantially as described.

In testimony whereof I have hereunto set my hand in presence of two subscribing witnesses.

FRED BLISS.

Witnesses:
　MILO M. BRUCE,
　FRANK KAPPMEYER.